(12) United States Patent
Stuetzler

(10) Patent No.: US 7,231,803 B2
(45) Date of Patent: *Jun. 19, 2007

(54) HYBRID IMPACT SENSOR

(75) Inventor: Frank-Juergen Stuetzler, South Lyon, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/983,547

(22) Filed: Nov. 8, 2004

(65) Prior Publication Data

US 2005/0274168 A1    Dec. 15, 2005

Related U.S. Application Data

(63) Continuation-in-part of application No. 10/866,386, filed on Jun. 11, 2004.

(51) Int. Cl.
*G01M 7/00* (2006.01)
(52) U.S. Cl. .................................... 73/12.01
(58) Field of Classification Search .... 73/12.01–12.09, 73/862.26
See application file for complete search history.

(56) References Cited

U.S. PATENT DOCUMENTS

| | | | |
|---|---|---|---|
| 3,186,217 A * | 6/1965 | Pfann | 73/777 |
| 4,125,820 A | 11/1978 | Marshall | |
| 4,262,532 A | 4/1981 | Butler et al. | |
| 4,511,877 A * | 4/1985 | Nishikawa et al. | 338/2 |
| 4,884,461 A | 12/1989 | Sawicki et al. | |
| 4,966,034 A | 10/1990 | Bock et al. | |
| 5,146,788 A | 9/1992 | Raynes | |
| 5,220,838 A | 6/1993 | Fung et al. | |
| 5,231,301 A | 7/1993 | Peterson et al. | |
| 5,275,055 A | 1/1994 | Zook et al. | |
| 5,351,549 A | 10/1994 | Baum et al. | |
| 5,390,951 A * | 2/1995 | Iyoda | 280/730.2 |
| 5,392,024 A | 2/1995 | Kiuchi et al. | |
| 5,453,638 A | 9/1995 | Nagele et al. | |
| 5,456,113 A | 10/1995 | Kwun et al. | |
| 5,483,842 A | 1/1996 | Foreman | |
| 5,544,716 A | 8/1996 | White | |

(Continued)

FOREIGN PATENT DOCUMENTS

EP    0 139 370    5/1985

(Continued)

OTHER PUBLICATIONS robotics.e-symposium, Honeywell Sensing & Control; pp. 1-2; http://honeywell.robotics.e-symposium.com/components/index.html.

(Continued)

*Primary Examiner*—Max Noori
(74) *Attorney, Agent, or Firm*—Michael Best & Friedrich LLP

(57) ABSTRACT

A hybrid impact sensor and method of operating the same. One sensor includes a support containing one or more mounts; a first sensor with first sensing properties and configured to generate a first output signal; a second sensor with second sensing properties and configured to generate a second output signal, wherein the second sensing properties are different from the first sensing properties; and a housing encasing the first sensor and the second sensor.

60 Claims, 14 Drawing Sheets

U.S. PATENT DOCUMENTS

| | | | |
|---|---|---|---|
| 5,566,974 A * | 10/1996 | Mazur et al. | 280/730.2 |
| 5,580,084 A * | 12/1996 | Gioutsos | 280/735 |
| 5,613,571 A | 3/1997 | Rank et al. | |
| 5,679,888 A | 10/1997 | Tohda et al. | |
| 5,681,997 A | 10/1997 | McHale et al. | |
| 5,684,336 A | 11/1997 | McCurdy | |
| 5,748,075 A * | 5/1998 | Dirmeyer et al. | 340/436 |
| 5,760,313 A | 6/1998 | Guentner et al. | |
| 5,767,766 A * | 6/1998 | Kwun | 340/436 |
| 5,786,744 A | 7/1998 | Nishio et al. | |
| 5,793,005 A | 8/1998 | Kato | |
| 5,834,646 A | 11/1998 | Kvisteroy et al. | |
| 5,866,821 A | 2/1999 | Raynes | |
| 5,873,597 A | 2/1999 | Sim | |
| 6,009,970 A | 1/2000 | Breed | |
| 6,023,664 A | 2/2000 | Bennet | |
| 6,030,851 A | 2/2000 | Grandmont et al. | |
| 6,032,092 A | 2/2000 | Laaser | |
| 6,057,585 A * | 5/2000 | Shinogi et al. | 257/419 |
| 6,065,346 A * | 5/2000 | Voegele et al. | 73/754 |
| 6,070,113 A | 5/2000 | White et al. | |
| 6,085,598 A | 7/2000 | Baba et al. | |
| 6,169,479 B1 * | 1/2001 | Boran et al. | 340/436 |
| 6,203,060 B1 * | 3/2001 | Cech et al. | 280/735 |
| 6,234,519 B1 | 5/2001 | Breed | |
| 6,256,563 B1 | 7/2001 | Blank et al. | |
| 6,324,450 B1 | 11/2001 | Iwama | |
| 6,407,660 B1 | 6/2002 | Bomya | |
| 6,422,596 B1 | 7/2002 | Fendt et al. | |
| 6,433,688 B1 | 8/2002 | Bomya | |
| 6,466,849 B2 | 10/2002 | Kamiji et al. | |
| 6,484,585 B1 | 11/2002 | Sittler et al. | |
| 6,536,259 B2 * | 3/2003 | Mattes | 73/12.09 |
| 6,583,616 B1 | 6/2003 | Bomya | |
| 6,619,123 B2 | 9/2003 | Gianchandani et al. | |
| 6,684,141 B2 | 1/2004 | Koors | |
| 6,746,043 B2 * | 6/2004 | Ishida | 280/735 |
| 6,898,498 B1 * | 5/2005 | Wessels et al. | 701/45 |
| 2002/0195807 A1 | 12/2002 | Ishida | |
| 2005/0194240 A1 * | 9/2005 | Stuve | 200/61.45 M |

FOREIGN PATENT DOCUMENTS

| | | |
|---|---|---|
| EP | 0 482 487 | 4/1992 |
| EP | 0 590 292 | 4/1994 |

OTHER PUBLICATIONS

Hegeon Kwun; Back in Style: Magnetostrictive Sensors; Technology Today; Sep. 1991; pp. 1-8; Southwest Research Institute; http://www.swri.edu/3pubs/brochure/d17/magneto/magneto.htm.

Wobschall, Darold; Circuit Design for Electronic Instrumentation, Analog and Digital Devices from Sensor to Display, Second Edition; 1987; Chapter 6, Displacement Sensors, pp. 99-101; Chapter 7, Pressure and Forece Sensors, pp. 118-120; McGraw-Hill Book Company.

* cited by examiner

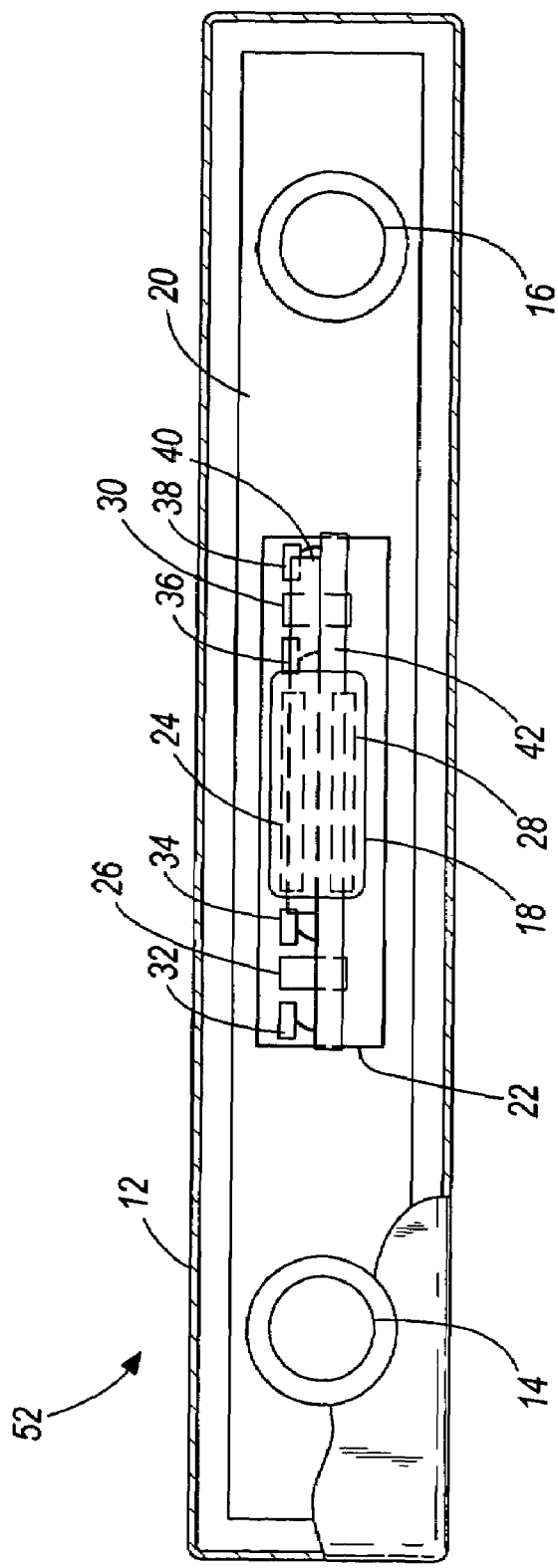
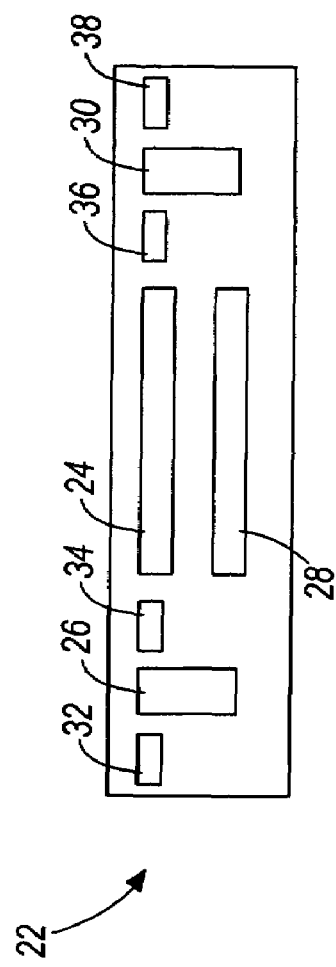
FIG. 4
FIG. 5

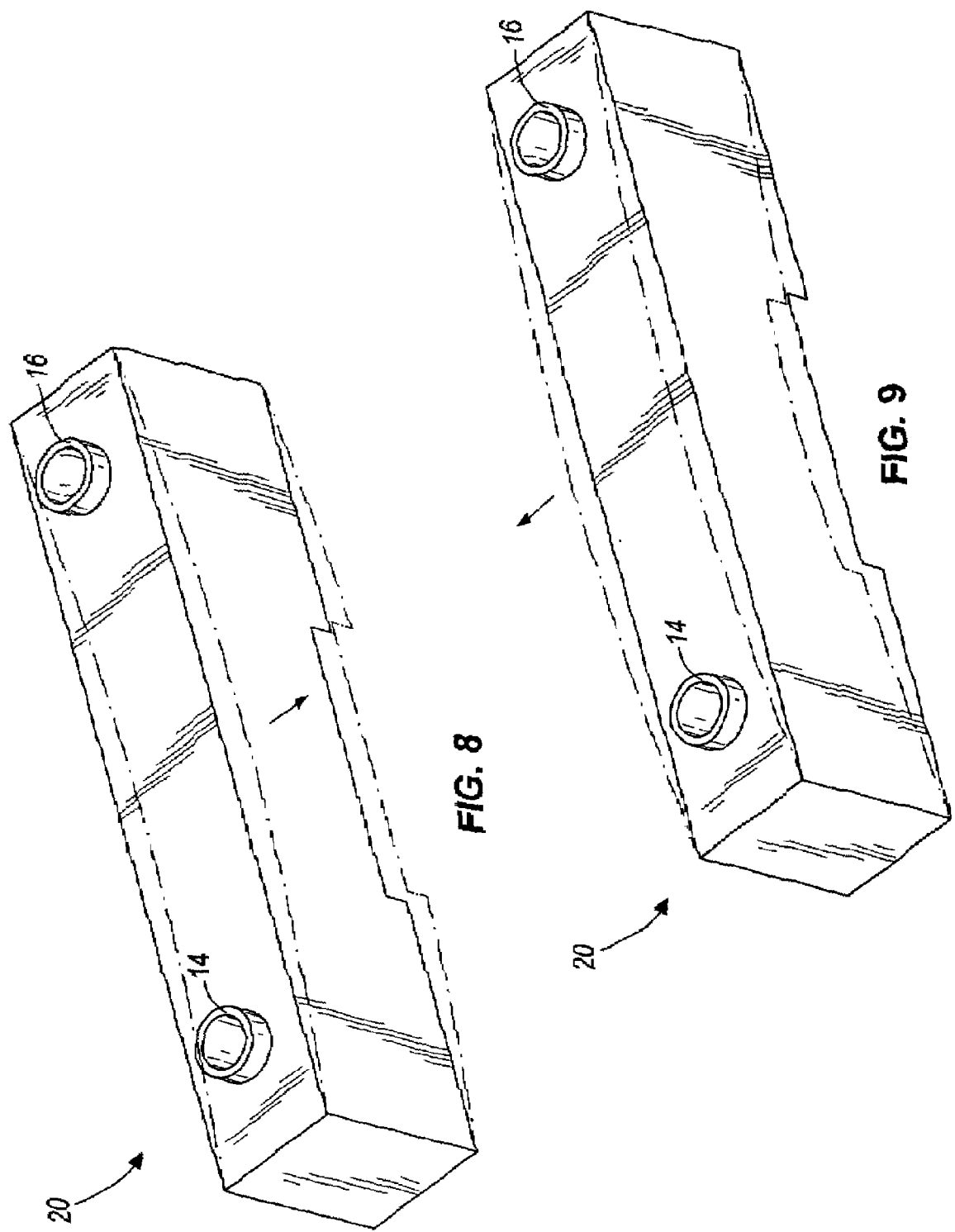

HYBRID IMPACT SENSOR

RELATED APPLICATIONS

The present patent application is a continuation-in-part of co-pending U.S. patent application Ser. No. 10/866,386, filed on Jun. 11, 2004, the entire contents of which are hereby incorporated by reference.

FIELD OF INTEREST

Embodiments of the invention relate to impact sensors including at least two types of sensors.

BACKGROUND OF THE INVENTION

Vehicles are often equipped with impact sensors so that air bags and other safety restraints can be triggered, for example, during an accident. Most sensors, however, can only sense impacts within a close proximity of the sensor. Safety sensor systems often include numerous accelerometers and/or door cavity pressure sensors separately or in combination. Numerous sensors are often employed since a sensor must be directly hit during an accident in order to detect impact. The sensors are often placed where impacts are common. Even though multiple sensors are used in detection systems, certain types of impacts are still difficult for the systems to identify. For example, impacts with narrow objects such as poles often pose a challenge for detection systems unless the pole directly hits a sensor. Thus, unless sensors completely cover all sides of a vehicle, the chance that an accident will be missed by the detection system still exists.

SUMMARY OF THE INVENTION

There is a need to provide sensors that can correctly detect an impact without having to be physically close to the point of contact.

In one embodiment, the invention provides a sensor that can measure the strain waves or stress waves traveling through a vehicle structure caused by deformation of the structure due to impact in a crash. The sensor is mounted onto a suitable vehicle structure, for example, the B-pillar of the vehicle or a reinforcing beam inside the door of the vehicle. The range of the sensor is adequate to allow only a single sensor to be placed along each side of a vehicle. The sensor includes a sensitive support that distorts when stress waves travel through it. A semiconductor element is mounted on the support such that it is distorted with the support. The semiconductor element, e.g., a silicon beam, may contain piezoresistors arranged in a Wheatstone-bridge configuration. The impedance of the piezoresistors changes as the physical characteristics of the attached support change. The sensor also contains a circuit capable of sensing the impedance of the piezoresistors. The change of the sensed impedance can be used to detect stress waves. By detecting the stress waves caused by impact and not the direct impact itself, the sensor can detect impacts that occur remotely from the location of the sensor.

In other embodiments, the stress wave sensor can be used to observe stress waves in other structures besides a vehicle structure. The sensor could be used to monitor stress applied to building or bridges or other compositions where unchecked stress strain can cause safety concerns. Any substance supporting the propagation of stress or force waves could be attached to the disclosed stress wave sensor. The material of the support contained within the sensor as well as the piezoresistant material used in the piezoresistors and semiconductor element can also be varied to create a specific sensor for specific types of stress waves.

In another embodiment, the invention provides a hybrid impact sensor. The sensor may include a support containing one or more mounts. The sensor may also include a first sensor with first sensing properties, which is configured to generate a first output signal and a second sensor with second sensing properties, which is configured to generate a second output signal. The second sensing properties are different from the first sensing properties. A housing encases the first sensor and the second sensor.

Another embodiment provides a method of sensing impact to a structure. The method may include providing a support with one or more mounts; providing a first sensor of a first sensing type; providing a second sensor of a second sensing type, wherein the second sensing type is different from the first sensing type; encasing the first sensor and the second sensor in a housing; generating a first output signal; and generating a second output signal.

Additional embodiments provide a hybrid impact sensor. The sensor may include a support containing one or more mounts and a semiconductor element mounted to the support between the mounts. The semiconductor element contains a plurality of piezoresistors. Each piezoresistor has an impedance and input and output terminals. The sensor may also include a circuit configured to be coupled to the input and output terminals of the plurality of piezoresistors. The circuit is capable of sensing the impedance of the plurality of piezoresistors. The sensor also includes a pressure sensor configured to generate a pressure signal.

Yet another embodiment provides a method for sensing impact to a structure. The method may include providing a support with one or more mounts; attaching a semiconductor element containing a plurality of piezoresistors, each having impedance, to the support; connecting the support to the structure with the mounts of the support; providing a pressure sensor configured to generate a pressure signal; encasing the support and the pressure sensor in a housing; sensing the impedance of the plurality of piezoresistors; and sensing the pressure signal.

Additional embodiments further provide a hybrid impact sensor. The sensor may include a support containing one or more mounts; a semiconductor element mounted to the support between the mounts and containing a plurality of piezoresistors each piezoresistor having an impedance and input and output terminals; a circuit configured to be coupled to the input and output terminals of the plurality of piezoresistors and capable of sensing the impedance of the plurality of piezoresistors; and an acceleration sensor configured to generate an acceleration signal.

Another embodiment provides a method for sensing impact to a structure. The method may include providing a support with one or more mounts; attaching a semiconductor element to a support, the element containing a plurality of piezoresistors, each having an impedance; connecting the support to the structure with the mounts of the support; providing an acceleration sensor configured to generate an acceleration signal; encasing the support and the pressure sensor in a housing; sensing the impedance of the plurality of piezoresistors; and sensing the acceleration signal.

Yet another embodiment provides a hybrid impact sensor. The impact sensor may include a support containing one or more mounts and a magnetostrictive sensor. The magnetostrictive sensor is configured to provide a stress wave signal. A pressure sensor configured to provide a pressure signal is also included in the impact sensor. A housing encases the magnetostrictive sensor and the pressure sensor. Instead of a pressure sensor, an acceleration sensor may also be used.

Additional embodiments provide a method for sensing impact to a structure. The method may include providing a support with one or more mounts; providing a magnetostrictive sensor configured to generate a stress wave signal; providing a pressure sensor configured to generate a pressure signal; encasing the magnetostrictive sensor and the pressure sensor in a housing; sensing the stress wave signal; and sensing the pressure signal. If an acceleration sensor is used in place of the pressure sensor, the method includes sensing an acceleration signal.

Other features and advantages of the invention will become apparent to those skilled in the art upon review of the detailed description, claims, and drawings.

BRIEF DESCRIPTION OF THE DRAWINGS

In the drawings:

FIG. 4 is a front view of the second exemplary illustrated in FIG. 3.

FIG. 5 is a schematic illustration of a semiconductor element suitable for use in the embodiments illustrated in FIGS. 1–3.

FIGS. 8 and 9 illustrate exemplary directions of bending of the support of the sensor of FIG. 1 due to stress waves traveling through it.

Figure 1:
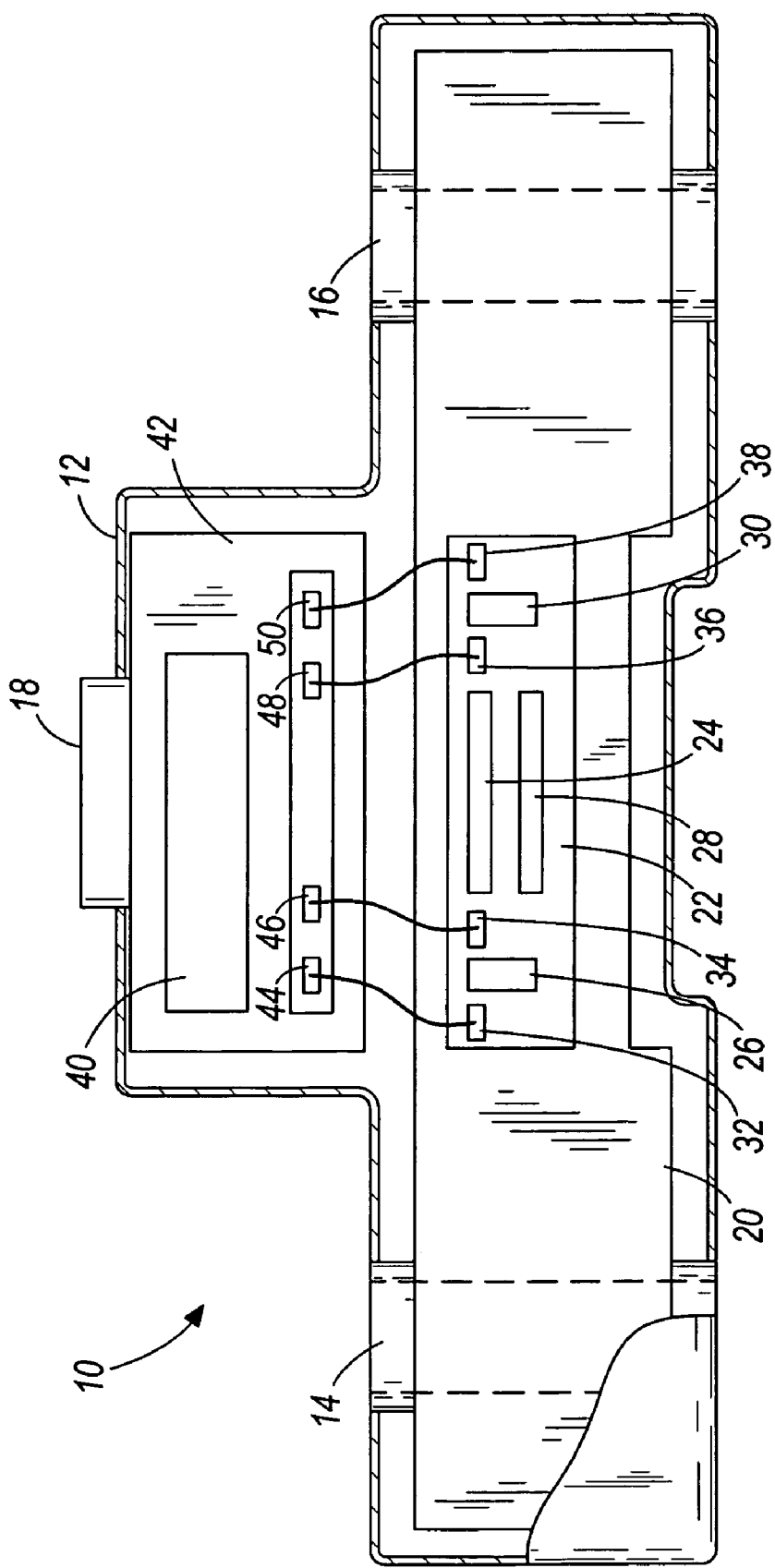
FIG. 1 is a top view of a first exemplary embodiment of the invention.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

DETAILED DESCRIPTION

FIG. 1 illustrates an exemplary sensor 10. The sensor 10 includes a housing 12 that encases the components of the sensor 10. The housing 12 helps protect the sensor 10 from dust and debris and other environmental hazards that may interfere with the functioning of the sensor 10. The sensor 10 also includes two mounts 14, 16 protruding out of the housing 12. The mounts 14, 16 provide a mechanism to allow the sensor 10 to be mounted onto a component or structure requiring stress monitoring, such as the frame of a vehicle. The mounts 14, 16 are used as an interface to the component or structure so that any stress waves traveling through the component are transmitted to the sensor 10. The mounts 14, 16 of the sensor 10 could be attached to a metal frame of a vehicle or a supporting beam of a building. Alternatively, the mounts 14, 16 could be studs capable of attaching to a component with screws or bolts. The sensor 10 also includes a connector 18 that may be used to transmit sensor measurements to other control units that may activate devices or mechanisms based upon the data collected by the sensor 10.

Located inside the housing 12 is a support 20. The support 20 contains the two mounts 14, 16 and, in the embodiment shown, is constructed with each mount on one end of the support, causing the support 20 to behave like a tuning fork. The two mounts 14, 16 act as tines of a tuning fork that are susceptible to stress waves, or vibrations. Stress waves or vibrations traveling through the beam or structure to which the sensor 10 is attached are transferred to the support 20 through the mounts 14 and 16.

The stress waves or vibrations cause the support 20 to vibrate and distort. The support 20 is made from a flexible material or substance that is sensitive to stress waves. Aluminum, for example, may be used since it is light and flexible. The support 20 could also be constructed from steel or even high strength plastic. The thickness and composition of the support 20 determine the degree to which the support 20 distorts and, ultimately, the sensitivity of the sensor 10. The support may also contain more or less mounts placed in various configurations, other than at ends of the support in order to facilitate the distorting of the support 20. For example, a circular support could be provided with three, four, or more mounts that may be attached to more than one beam or structure. Each mount will transmit stress waves from the beam or structure, to which it is attached, to the circular support.

The support 20 also serves as a foundation for a semiconductor element 22. The semiconductor element 22 is attached to the support 20 such that the support 20 transfers any distortions caused by stress waves traveling through the support 20 to the semiconductor element 22. Just as the support 20 is flexible in order to distort due to the propagation of stress waves, the semiconductor element 22 has similar flexibility. The semiconductor element 22 is attached along a surface of the support 20. In one embodiment, the semiconductor element 22 is attached flat to the surface of the support 20 so that the semiconductor element 22 will distort as the support 20 does.

The semiconductor element 22 includes piezoresistors 24, 26, 28, and 30. The piezoresistors 24, 26, 28, and 30 are arranged in a Wheatstone-bridge configuration. The piezoresistors 24, 26, 28, and 30 are constructed with a material whose resistivity is influenced by the mechanical stress applied to the material such as piezoresistant material. Examples of piezoresistant materials include, but are not limited to, silicon, polycrystalline silicon, silica glass, zinc oxide, and germanium. In one embodiment, the piezoresistors 24, 26, 28, and 30 are divided into two categories. The piezoresistors 24 and 28 are used as sensing piezoresistors and are arranged horizontally along the major or longitudinal axis of the semiconductor element 22. The piezoresistors 26 and 30 are used as reference piezoresistors, are smaller, and are arranged vertically or along the width of the semiconductor element 20. The reference piezoresistors 26 and 30 have less impedance than the sensing piezoresistors 24 and 28. The physical arrangement and characteristics of the two categories of piezoresistors make the sensing piezoresistors 24 and 28 more sensitive than the reference piezoresistors 26 and 30 to distortions of the semiconductor element 22 since they cover an area of the semiconductor element 22 that is more likely to distort in response to a stress wave passing through the support 20. Likewise, the reference piezoresistors 26 and 30 are less sensitive to the distortions of the semiconductor element 22 since they cover less area of the semiconductor element 22 and are arranged closer to ends of the support 20 where the support 20 distorts less. When the support 20 and the attached semiconductor element 22 are distorted by stress waves, the impedance of the sensing piezoresistors 24 and 28 will change more than the impedance of the reference piezoresistors 26 and 30. The difference between the changes of impedance of the two categories of piezoresistors can also be used to further estimate the characteristics of the impact or stress on the component that the sensor 10 is attached to.

The semiconductor element 22 also contains input and output terminals 32, 34, 36, and 38. The input and output terminals 32, 34, 36, and 38 are used to apply and measure voltage and/or current passing through the piezoresistors 24, 26, 28, and 30. The applied voltage and measured current can be used to calculate resistance by Ohm's law:

$$V = I\,R$$

where V represents the voltage applied to the circuit, I represents the current measured from the circuit, and R represents the resistance of the circuit.

The support 20 may also be constructed from a semiconductor material and may directly contain the piezoresistors 24, 26, 28, 30 rather than a separate semiconductor element 22 attached to the support 20. Any distortion of the semiconductor support created by stress waves traveling through the attached structure also causes the material of the embedded piezoresistors to distort. The semiconductor support may also contain input/output terminals used to apply and transmit voltage and/or charge flowing through the semiconductor support.

Applying voltage, measuring current, and calculating resistance can all be performed by a processor such as an application specific integrated circuit ("ASIC") 40 attached to the semiconductor element 22. The ASIC 40 is shown as being attached to a printed circuit board ("PCB") 42 through the input and output terminals 44, 46, 48, and 50. Other connections and even other calculating mechanisms may be used. For example, a chip or microprocessor could also replace the ASIC 40. The ASIC 40 could also be eliminated from the sensor 10 and the output and input terminals 32, 34, 36, and 38 of the semiconductor element 22 could be directly coupled to the connector 18. By directly coupling the semiconductor element 22 to the connector 18 the processing of the measurements taken by the sensor 10 (i.e., the calculating of resistance) can be carried out outside of the sensor 10 at a remote control unit. The connector 18 may provide amplification or filtering to improve the characteristics of any data sent from the sensor 10 or received by the sensor 10, for example current or voltage values. However, the connector 18 does not process the data in order to deduce the meaning of the data such as to what degree the support 20 is stressed and distorted. The ASIC 40 may also act as a relay or amplifier for a sensed current measurement based on a constant application of voltage. The ASIC 40 could also process the sensed current of the piezoresistor arrangement and calculate a change in resistance, which could be used to further calculate a degree of stress applied to the support.

Figure 2:
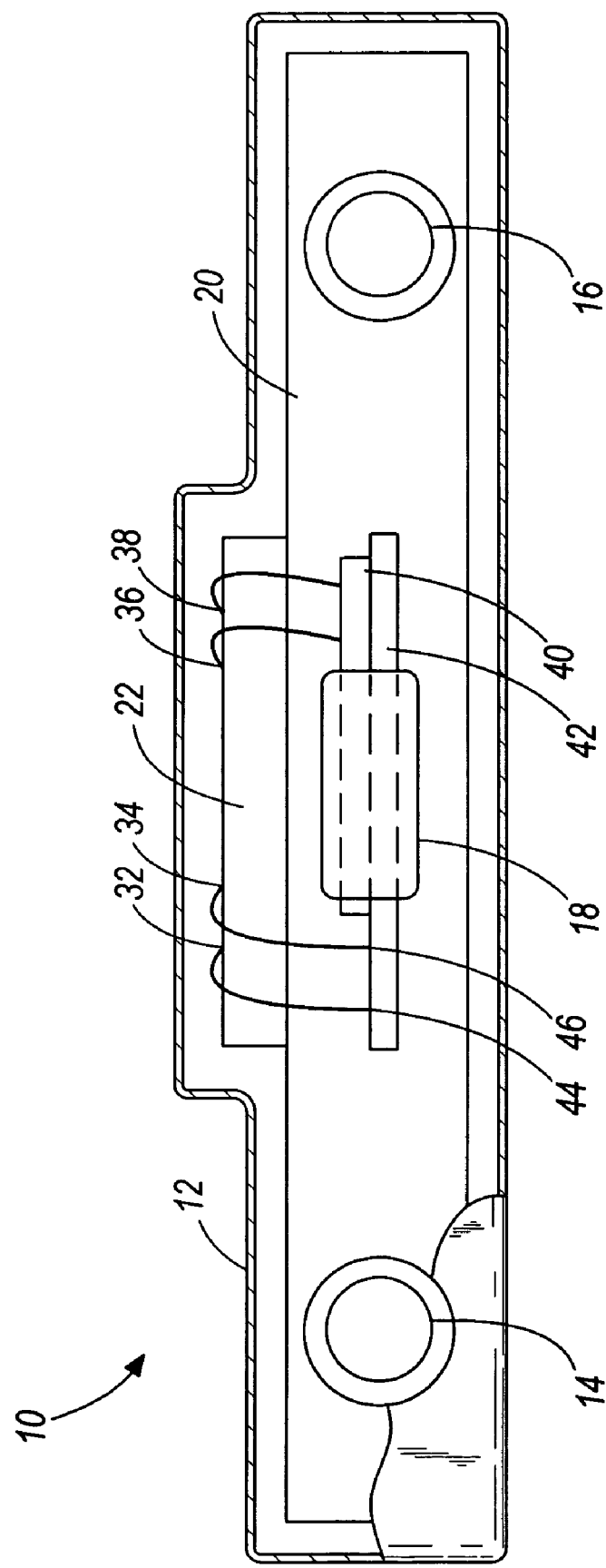
FIG. 2 is a front view of the exemplary embodiment illustrated in FIG. 1.

FIG. 2 illustrates the sensor 10 of FIG. 1 from a front view. The connector 18, shown with solid lines, is protruding toward the viewer. Two ends of the two mounts 14 and 16 are also protruding toward the viewer. The PCB 42 and attached ASIC 40 and the semiconductor element 22 are also displayed in phantom lines situated beneath the connector 18. The input and output terminals 44 and 46 (input and output terminals 48 and 50 are hidden behind the ASIC 40) of the PCB 42 and the input and output terminals 32, 34, 36, and 38 of the semiconductor element 22 are also shown in phantom lines along with the support 20 and the two mounts 14 and 16.

Figure 3:
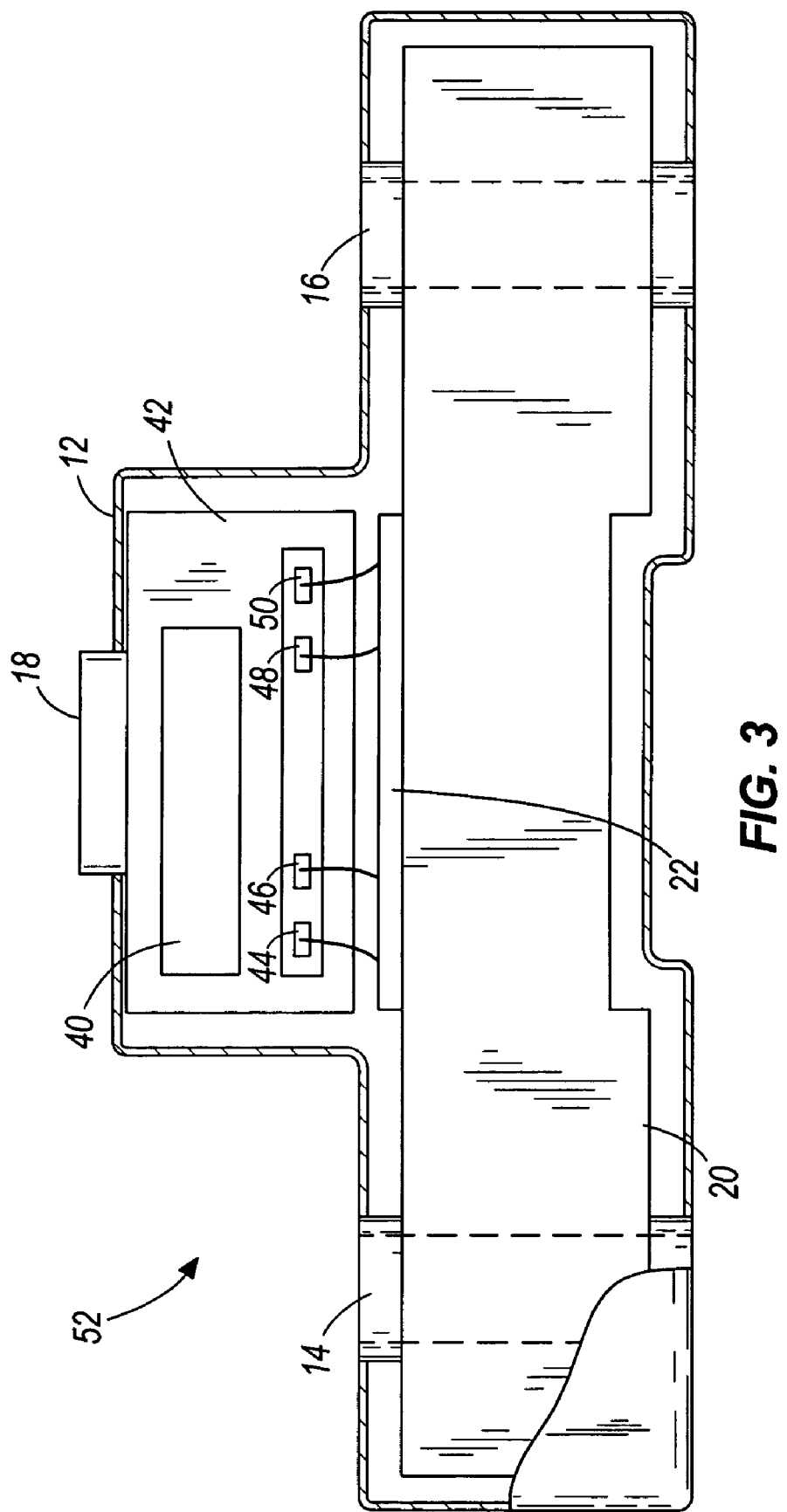
FIG. 3 is a top view of a second exemplary embodiment of the invention.

FIG. 3 illustrates a second exemplary sensor 52 from a top view. The sensor 52 contains all the same components as the sensor 10, but the semiconductor element 22 is not located on the top surface of the support 20. As can be seen in FIG. 3, the semiconductor element 22 is attached along the front edge of the support 20. The surface of the semiconductor element 22 containing the piezoresistors is positioned at a right angle to the ASIC 40 and PCB 42 rather than positioned parallel to the ASIC 40 and PCB 42 as in the sensor 10. Similarly, the semiconductor element 22 may be placed on the back surface or edge of the support 20. The location of the semiconductor element 22 can be varied to adjust the functionality of the sensor. The position of the semiconductor element 22 can also be varied to change the size and dimensions of the sensor. For example, placing the semiconductor element 22 on the front edge of the support 20 reduces the thickness of the sensor. The semiconductor element 22 may also be placed in a location where it can be easily replaced or tested, if needed.

FIG. 4 illustrates the sensor 52 from a front view. Since the semiconductor element 22 is positioned along the front edge of the support 20 the piezoresistors 24, 26, 28, and 30 contained within the semiconductor element 22 are seen when the sensor 52 is viewed from the front. When viewed from the front, the ASIC 40 and PCB 42 hinder the full view of the semiconductor element 22 since the semiconductor element 22 is positioned in a plane perpendicular to the plan containing the ASIC 40 and PCB 42. The connector 18 is shown in phantom lines and is protruding toward the viewer.

FIG. 5 illustrates the semiconductor element 22 displayed in FIGS. 1–4. The semiconductor element 22 contains the four piezoresistors 24, 26, 28, and 30 as well as the input and output terminals 32, 34, 36, and 38. As mentioned above, the sensing piezoresistors 24 and 28 are arranged length-wise in the middle of the semiconductor element 22. Their position makes them more sensitive to distortions of the semiconductor element 22 than the reference piezoresistors 26 and 30 since they cover an area of the semiconductor element 22 that is more likely to distort in response to stress waves. The reference piezoresistors 26 and 30 are less sensitive to the distortions of the semiconductor element 22 since they cover less area of the semiconductor element 22 and are arranged closer to ends of the support 20 where the support 20 distorts less. The reference piezoresistors 26 and 30 may have higher impedance than the sensing piezoresistors 24 and 28. Other constructions are also possible. All four resistors may have identical impedance or their impedance may be varied to better utilize and categorize a reading from the sensor. Each terminal 32, 34, 36, and 38 of the semiconductor element 22 may have a designated data flow such as input only or output only or both may be bi-directional. The input and output terminals 32, 34, 36, and 38 may be configured to be coupled to a variety of devices including a PCB, a microprocessor, or a connector.

Figure 6:
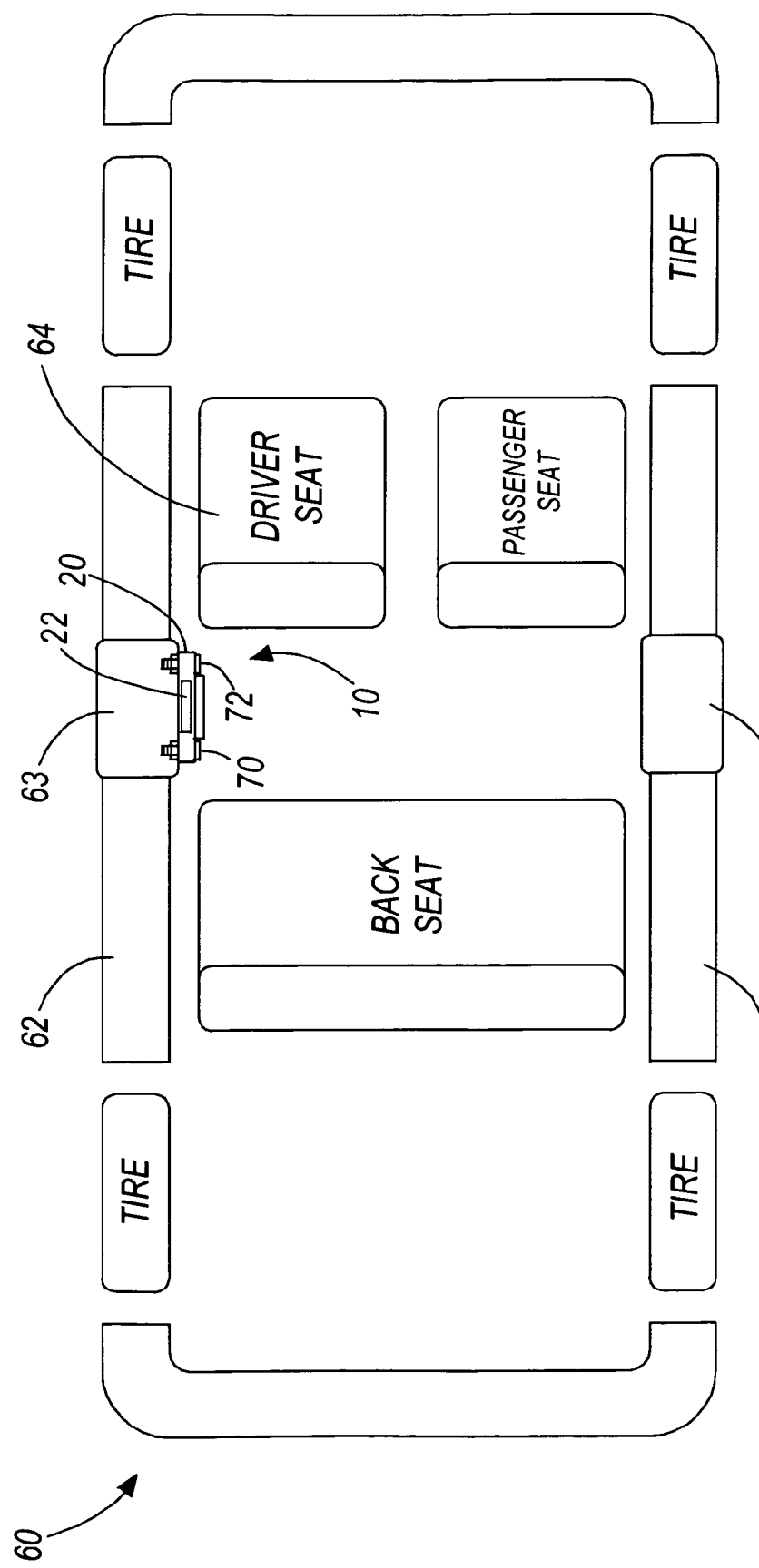
FIG. 6 is a top-view illustration of the sensor of FIG. 1 mounted to a vehicle structure.

FIG. 6 illustrates the sensor 10 shown in FIGS. 1 and 2 mounted in a vehicle 60. The sensor 10 and the components of the vehicle 60 are not drawn to scale. For the sake of clarity, the sensor 10 is illustrated without the housing 12, the connected ASIC 40 and PCB 42, and the connector 18. The vehicle 60 contains a side sill 62 and a B-pillar 63 on each side. The side sills 62 are positioned parallel to a surface that the vehicle 60 travels on and supports the side doors and windows. The B-pillars 63 are attached to the side sills 62 and protrude upward toward the roof of the vehicle 60. The B-pillars 63 may connect along the roof of the vehicle or may simply extend and connect to the roof. The sensor 10 is shown mounted on a B-pillar 63. A single sensor 10 is shown mounted to the side of the vehicle 60 located next to a driver seat 64 for illustration purposes only. In practical use, each side of the vehicle 60 may include a sensor 10. The sensor 10 may also be mounted to other structures of the vehicle 60 capable of transmitting stress waves such as the side sills 62, roof, or other supporting frames. The mounts 14 and 16 are connected to the B-pillar 63 with screws 70, 72. As indicated earlier, the screws 70, 72 could be replaced with bolts, rivets, or any other fastener. The mounts 14, 16 could also be soldered or welded to the B-pillar 63. Other constructions are also possible depending on the composition and position of the mounts 14 and 16 and the structure to which the mounts 14, 16 are attached.

Once the sensor 10 has been attached to the B-pillar 63, any stress waves traveling through the B-pillar 63 are transmitted to the sensor 10. Stress waves travel from the B-pillar 63 and through the mounts 14 and 16 to the support 20. The support 20 distorts according to the amplitude, frequency, or other characteristic of the stress waves, which also causes the semiconductor element 22 attached to the support 20 to distort. The distortion of the semiconductor element 22 causes the resistance of the piezoresistors 24, 26, 28, 30 to change. The change in the resistance of the piezoresistors 24, 26, 28, 30 can be processed by the ASIC or other processing device to monitor stress present in the B-pillar 63 of the vehicle 60. Changes in the resistance of the piezoresistors can indicate a collision or accident that may require the activation of safety restraint devices such as seatbelts or airbags.

Figure 7:
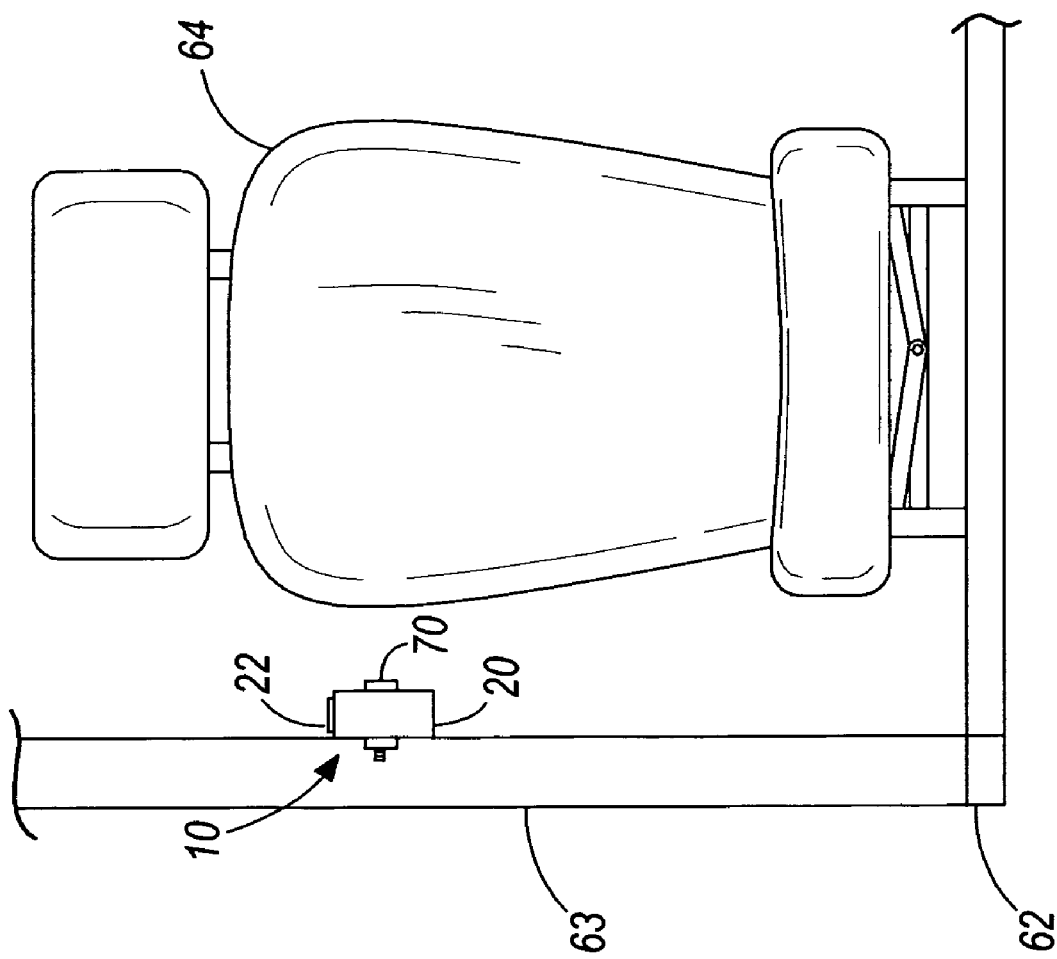
FIG. 7 is a rear-view illustration of the sensor of FIG. 1 mounted to a vehicle structure.

FIG. 7 illustrates the sensor 10 mounted to a B-pillar 63 of a vehicle 60 from a rear view. The side sill 62 is shown supporting the B-pillar 63 that is positioned parallel and adjacent to the driver seat 64. The sensor 10 is illustrated mounted to the B-pillar 63 with the screw 70. Another screw may be used to mount the other end of the sensor 10 to the B-pillar 63 although it is not shown.

FIGS. 8–9 illustrates the support 20 of the sensor 10 distorted due to stress waves. The dashed lined illustrates the support 20 distorted from its original position, which is shown in solid lines. For purpose of illustration the support 20 is shown without the housing 12, the semiconductor element 22, the ASIC 40 and PCB 42, and connector 18. The stress waves cause the support 20 to distort into a U-shaped beam either upward toward the top of the sensor 10 or downward toward the bottom of the sensor 10.

Figure 10:
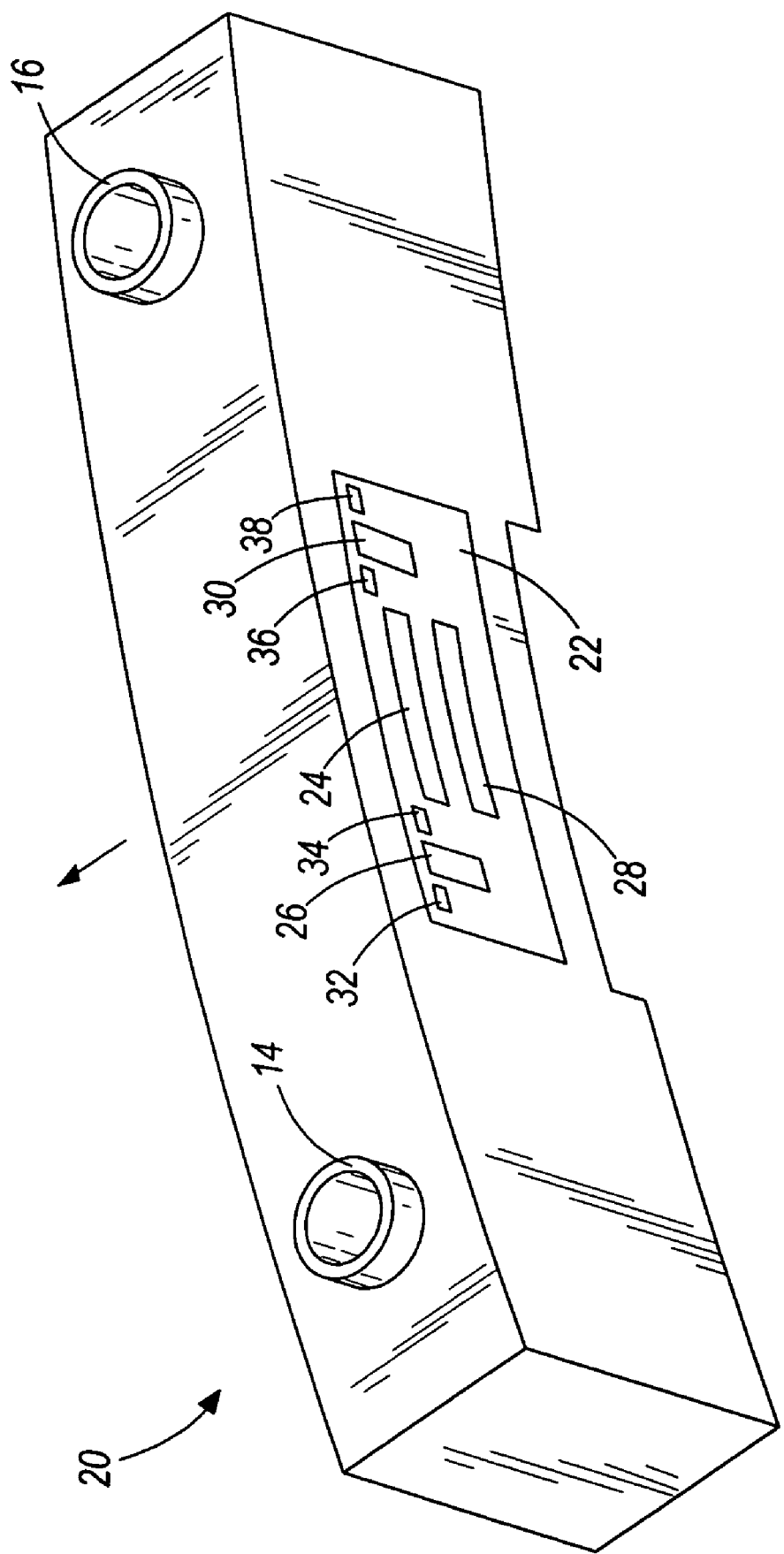
FIG. 10 illustrates the support and semiconductor element of the sensor of FIG. 1 bending due to stress waves traveling through it.

Referring to FIG. 10, as the support 20 distorts so does the attached semiconductor element 22. The semiconductor element 22 contains the piezoresistors 24, 26, 28, and 30 that also distort with the semiconductor element 22. As shown in FIG. 10, the sensing piezoresistors 24, 28 are distorted more than the reference piezoresistors 26, 30 due to there position and size. Since the support 20 bends length-wise into a U-shape, the sensing piezoresistors 24, 28 are distorted while the reference piezoresistors 26, 30 are not. As sensing piezoresistors 24 and 28 distort, their associated impedance changes due to the physical change of the material of the sensing piezoresistors 24 and 28. The ASIC 40 (not shown) can monitor the change of impedance of the sensing piezoresistors 24 and 28 so that the safety mechanisms may be activated when appropriate.

In the case of an accident at any point along a side of the vehicle 60, the impact of the accident causes stress waves to propagate through the vehicle structure 50 and to the attached sensor. If the structure of the vehicle 60 is integral or unitary, a single sensor may be used to sense impact anywhere along the vehicle. It may be desirable, however, to place a sensor along each side of the vehicle 60 to reduce the travel distance and, therefore, also reduce the travel time of the stress waves. Such a configuration also increases the reaction time of the system. Using a sensor on each side of a vehicle also increases the sensitivity and accuracy of each sensor since the stress waves travel a shorter distance. This decreases the amount of time and the amount of material that the stress wave travels through. Certain characteristics of the waves may dissipate over time or as the waves travel through various media.

The support 20 returns to its original shape after the stress waves have passed through it. In severe accidents or collision the support 20 may be distorted to a point where it retains its distorted shape. In this case, the accident would likely cause damage to the vehicle that requires repair before the vehicle can be used again, and the sensor may also need to be repaired in this situation.

In some embodiments, the sensor is paired with another sensor with different sensing principals to provide a hybrid impact sensor. Combining two different sensors that sense different variables in a single hybrid sensor helps increase the range, accuracy, and efficiency in detecting vehicle impact.

Figure 11:
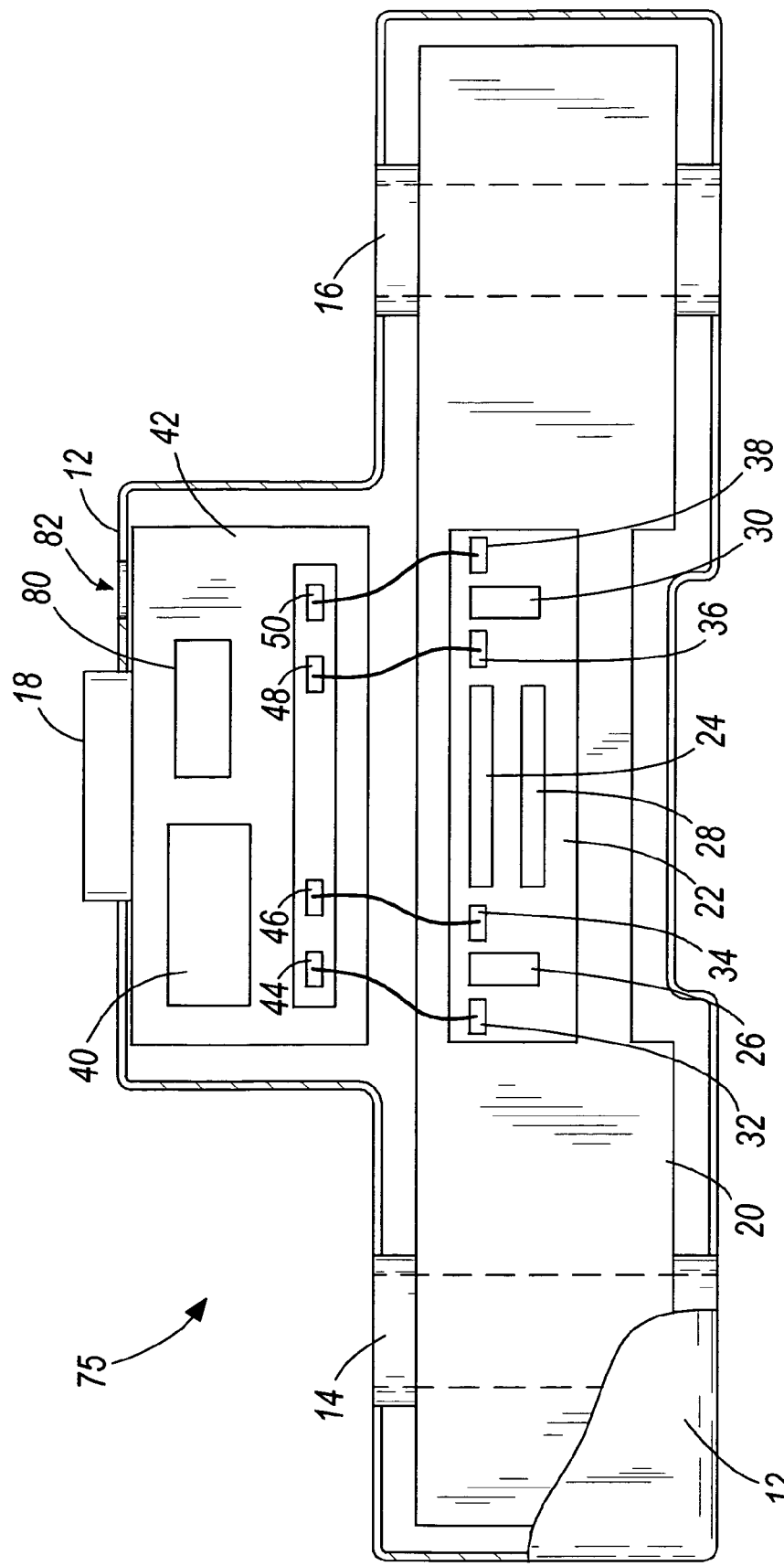
FIG. 11 is a top view of an exemplary embodiment of the invention.

FIG. 11 illustrates an exemplary hybrid sensor 75. The hybrid sensor 75 includes the sensor 10 and a pressure sensor 80. In some embodiments, the pressure sensor 80 is attached to the PCB 42 and includes a door cavity pressure sensor that is configured to measure door cavity pressure changes that may occur during impact. The pressure sensor 80 may include one or more micromachined silicon door cavity pressure sensors, which are manufactured, among others, by Analog Devices and Motorola. Door cavity pressure sensors are well known in the art and, therefore, not described in detail. The pressure sensor 80 may also include other components such as an ASIC, input/output terminals, and the like.

As shown in FIG. 11, the sensor 10 and the pressure sensor 80 are contained within the housing 12. In order for the pressure sensor 80 to measure pressure changes, the housing 12 may include an opening 82. The opening 82 may also be constructed to limit or prevent pressure changes due to changes in humidity or other air characteristics unrelated to changes due to impact.

Figure 12:
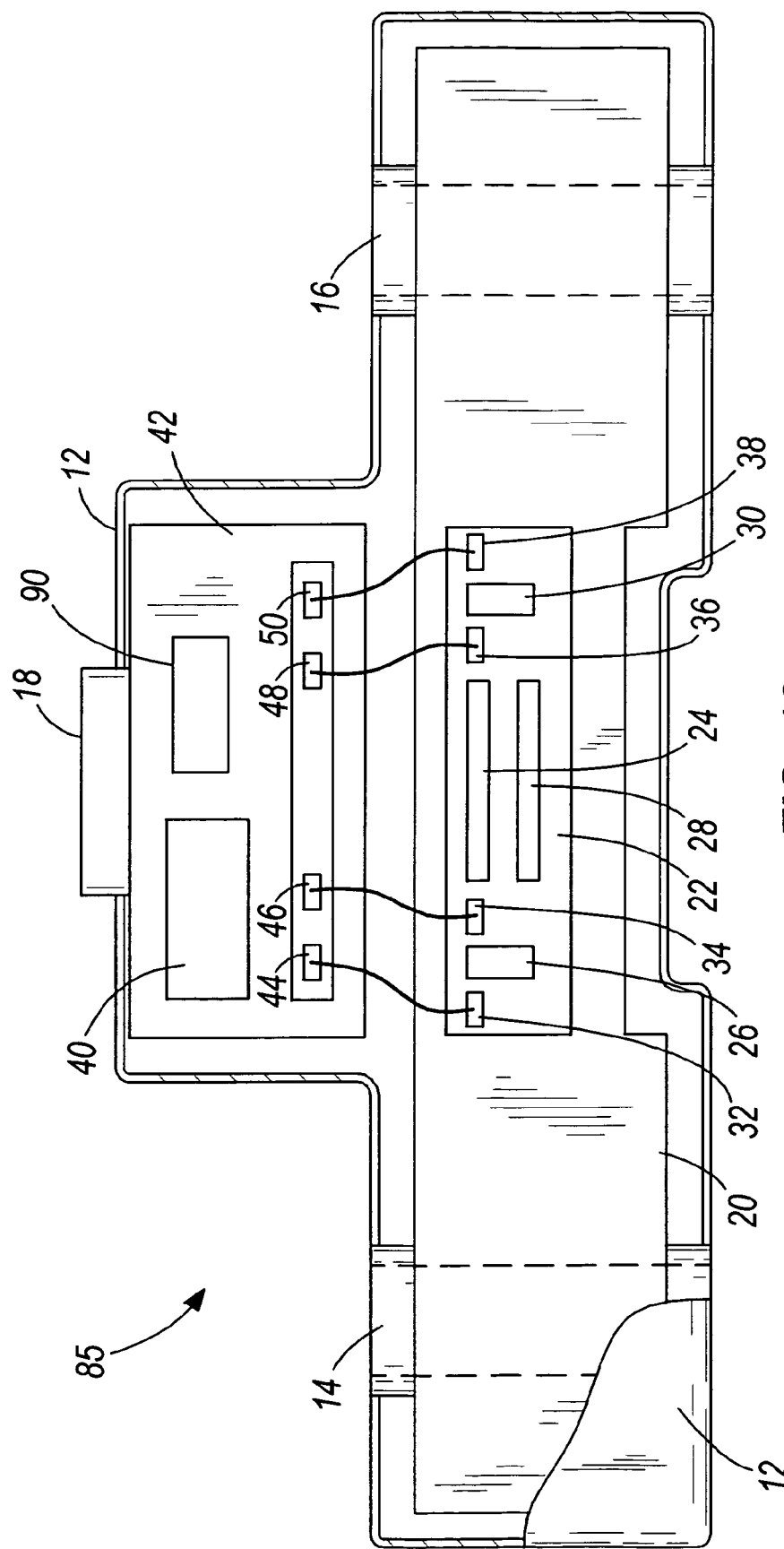
FIG. 12 is a top view of another exemplary embodiment of the invention.

FIG. 12 illustrates another exemplary hybrid sensor 85. The hybrid sensor 85 includes the sensor 10 and an acceleration sensor 90. In some embodiments, the acceleration sensor 90 is attached to the PCB 42 and includes an accelerometer configured to measure acceleration or deceleration of a vehicle or other object. The acceleration sensor 90 may include one or more micromachined silicon acceleration sensors like those manufactured by Analog Devices and Motorola among others. Acceleration sensors are well known in the art and, therefore, not described in detail. The acceleration sensor 90 may also include other components such as an ASIC, input/output terminals, and the like. As shown in FIG. 12, the sensor 10 and the acceleration sensor 90 are also contained within the housing 12.

The hybrid sensors 75 and 85 may provide early impact detection, and, as described for the sensors 10 and 52, a single hybrid sensor 75 or 85 may be capable of detecting impact along an entire side of a vehicle. The dual sensing properties of the hybrid sensors 75 and 85 may also provide more accurate impact sensing, since one sensor can double-check the operation of the other sensor. For example, if the pressure sensor 80 or acceleration sensor 90 detects characteristics such as pressure changes or high rates of deceleration that may indicate impact while the sensor 10 does not detect corresponding stress waves indicating impact, safety equipment such as seat belt tensioning or air bags may not be activated. The multiple sensing properties may provide safing functionality to activate safety equipment when it is necessary and/or safe to do so.

It should be understood that the hybrid sensors 75 and 85 may include multiple sensors 10 and multiple pressure sensors 80 and/or acceleration sensors 90. The hybrid sensors 75 and 85 may also include other types of sensors in place of or in addition to the pressure sensor 80 and/or acceleration sensor 90. For example, the hybrid sensors 75 and 85 may include speed sensors, brakes sensors, steering wheel sensors, transmission sensors, and the like, to detect impact to a vehicle. The sensor 10 may also be replaced with the sensor 52, as described above, as well as other configurations. The pressure sensor 80 and acceleration sensor 90 may also be placed at different locations on the sensor 10. For example, the pressure sensor 80 or acceleration sensor 90 may be attached to a separate PCB (not shown). The opening 82 in the housing 12 for the pressure sensor 80 may also be located in various locations and have various configurations.

Figure 13:
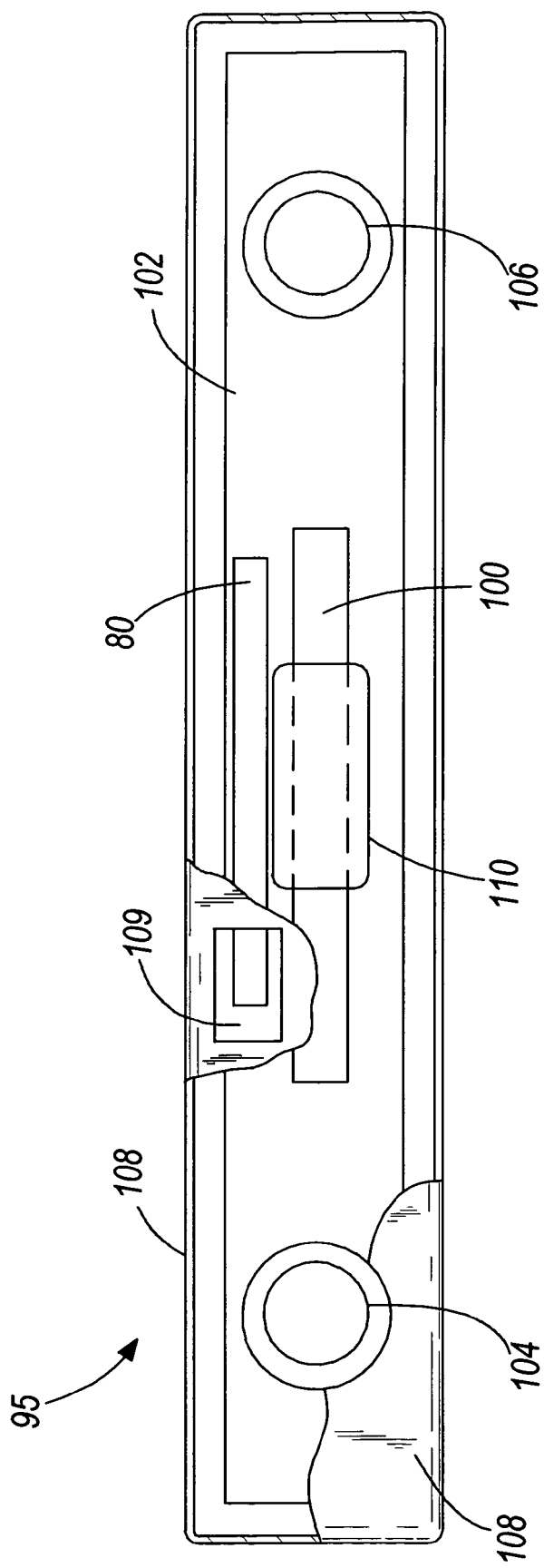
FIG. 13 is a front view of another exemplary embodiment of the invention.
Figure 14:
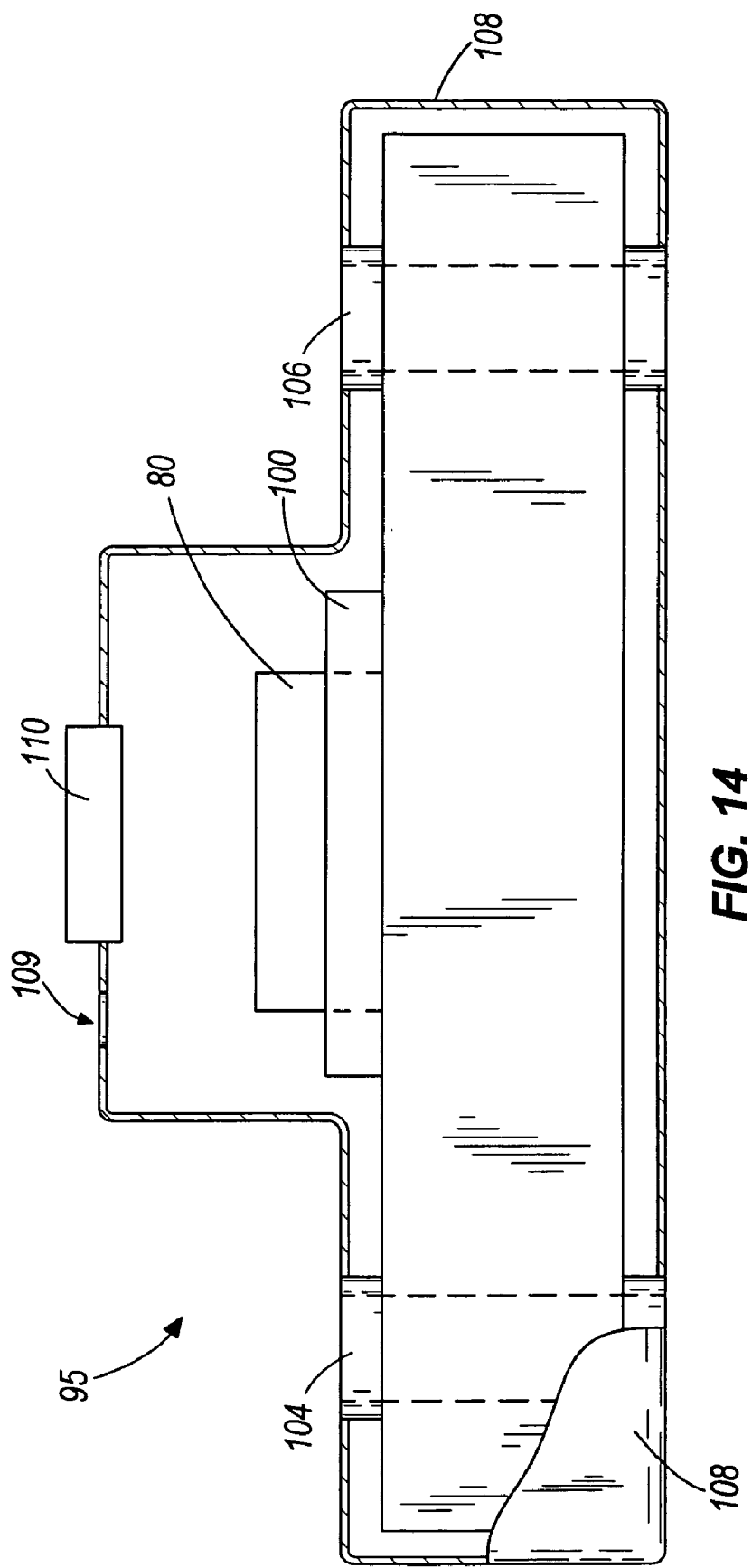
FIG. 14 is a top view of the exemplary embodiment illustrated in FIG. 13.

The sensor 10 may also be replaced with other stress wave sensors to create additional hybrid sensors. FIGS. 13 and 14 illustrate a hybrid sensor 95 from a front and top view respectively. The hybrid sensor 95 includes the pressure sensor 80, as described above, and a magnetostrictive sensor 100. Magnetostrictive sensors useful in embodiments of the invention include sensors manufactured by Southwest Research Institute and are described in U.S. Pat. Nos. 5,456,113; 5,457,994; and 5,767,766. Magnetostrictive sensors are configured to detect stress waves traveling through a structure by detecting variations in magnetization. Magnetostrictive sensors can actively or passively detect stress or strain to a structure. Active magnetostrictive sensors may introduce a stress wave with certain characteristics to a structure and may detect any modifications and/or reflections of the stress wave due to fractures or cracks in the structure. Modifications of the introduced stress waves may cause changes in magnetic flux detectable by a receiving coil of the sensor. Passive magnetostrictive sensors may monitor for stress waves introduced by structure cracking, breaking, impacts, or vibrations that also cause changes in magnetic flux detectable by a receiving coil of the sensor. As described for the sensors 10 and 52 above, magnetostrictive sensors 100 may be able to detect impacts fast and efficiently even if they are not located directly at the point of impact. The ability to sense impact over an extended area allows fewer magnetostrictive sensors 100 to be used to impact monitoring systems. When used in vehicles, a single magnetostrictive 100 sensor may be employed on each side of the vehicle to detect impacts along the entire side of the vehicle. When paired with an independent sensor, such as the pressure sensor 80, the operation of the magnetostrictive sensor 100 can be verified or double-checked by the operation of the independent sensor. The independent sensor provides safing functionality for the magnetostrictive sensor so that safety equipment, which can often only be deployed once and may cause injury or damage if deployed unnecessarily, is only activated when required.

The magnetostrictive sensor 100 and pressure sensor 80 may be encased within a housing 108. The housing 108 may also include an opening 109 for the pressure sensor 80. In some embodiments, the housing 108 is constructed from an insulating material such as plastic. The housing 108 may also be constructed from aluminum.

The positions of the magnetostrictive sensor 100 and the pressure sensor 80 and/or acceleration sensor 90 may be fixed by a potting material (not shown) that fills the interior of the housing 108. The magnetostrictive sensor 100 and pressure sensor 80 may also be attached to a support 102. The support 102 may be constructed of a ferromagnetic material that has a magnetostrictive property that causes physical and/or dimensional changes associated with variations in magnetism. Stress waves traveling through the support 102 may cause changes in magnetic flux detectable by the magnetostrictive sensor 100.

The housing 108 may includes two mounts 104 and 106. The mounts 104 and 106 protrude may provide a mechanism for the hybrid sensor 95 to be attached onto a component or structure requiring stress monitoring such as the frame of a vehicle. The mounts 104 and 106 may also extend and be connected to the support 102 when present.

The mounts 104 and 106 are used as an interface to the component or structure so that any stress waves traveling through the component are transmitted to the hybrid sensor 95. The mounts 104 and 106 of the hybrid sensor 95 could be attached to a metal frame of a vehicle or a supporting beam of a building. In some embodiments, the hybrid sensor 95 may be mounted on an inner door panel with the pressure sensor 80 or opening 109 facing the door cavity. The hybrid sensor 95 may also be mounted on a reinforcing beam typically provided in door panels to increase door stiffness against intruding or impacting objects. Alternatively, the mounts 104 and 106 could be studs capable of attaching to a component with screws, bolts, or rivets.

The hybrid sensor 95 may also include a connector 110 that may be used to transmit sensor measurements or detections to a control unit that may activate devices or mechanisms based upon the data collected by the hybrid sensor 95.

Figure 16:
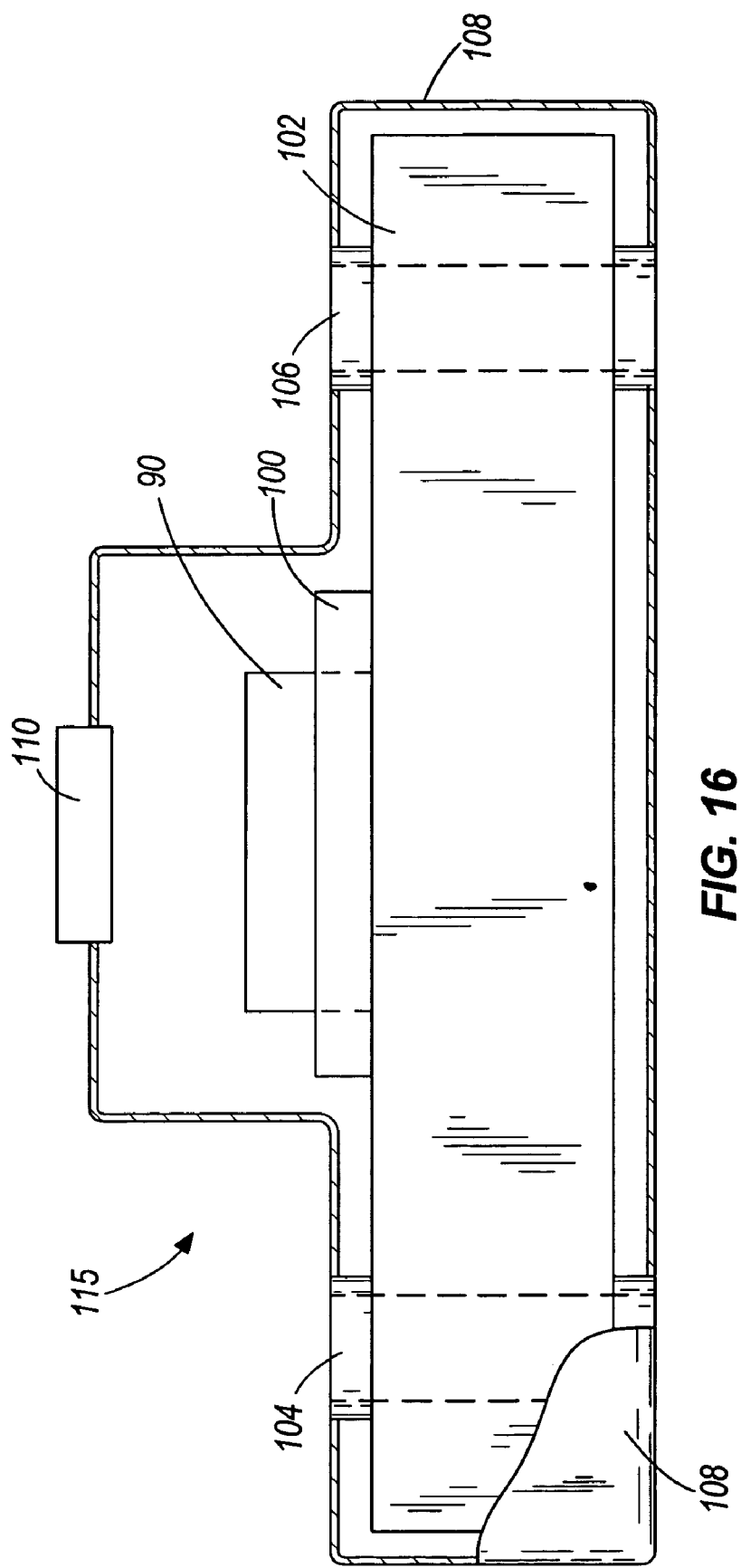
FIG. 16 is a top view of the exemplary embodiment illustrated in FIG. 15.

FIG. 16 shows another exemplary hybrid sensor 115 from a top view. The hybrid sensor 115 includes the magnetostrictive sensor 100 and the acceleration sensor 90. As described for the hybrid sensor 95, positions of the magnetostrictive sensor 100 and acceleration sensor 90 may be fixed by a potting material (not shown) or by attaching the magnetostrictive sensor 100 and the acceleration sensor 90 to the support 102. The magnetostrictive sensor 100 and the acceleration sensor 90 are also encased within the housing 108, which includes the mounts 104 and 106. The hybrid sensor 115 may also include the connector 110.

Figure 15:
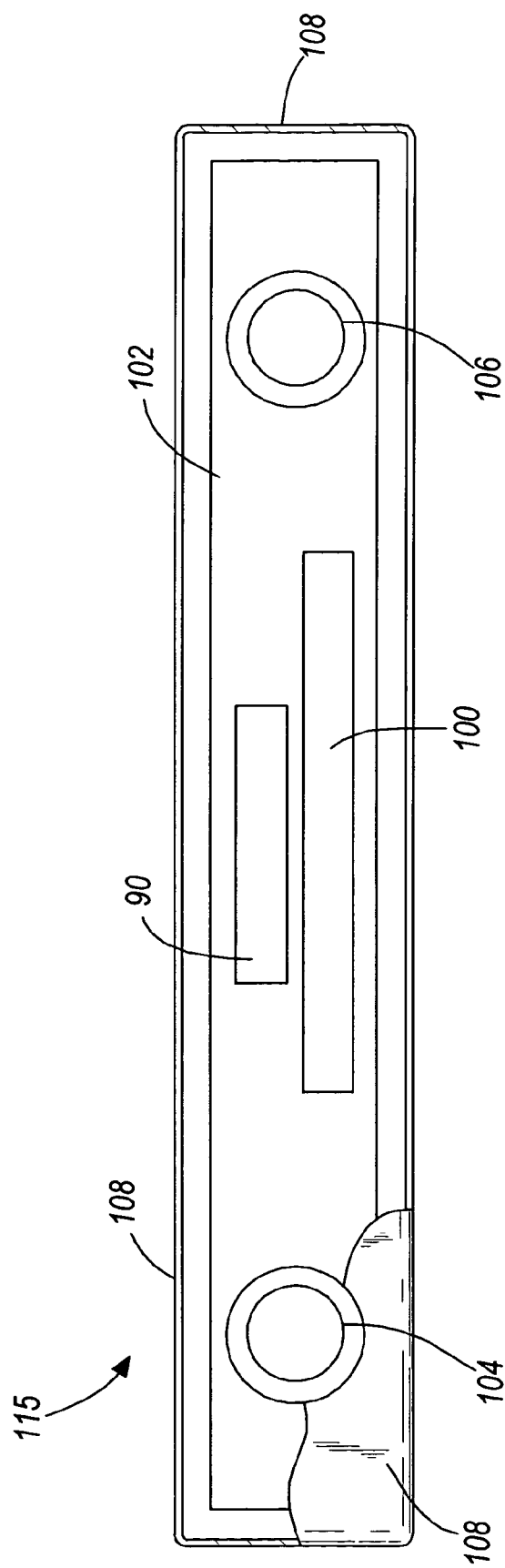
FIG. 15 is a front view of yet another exemplary embodiment of the invention.

It should be understood that the hybrid sensors 95 and 115 may include multiple magnetostrictive sensors 100 and multiple pressure sensors 80 and/or acceleration sensors 90. The magnetostrictive sensor 100, pressure sensor 80, and acceleration sensor 90 may also be located in various configurations. Although the magnetostrictive sensors 100 are illustrated next to the pressure sensor 80 and acceleration sensor 90 in FIGS. 13 and 15 respectively, other configurations are possible. In some embodiments, the pressure sensor 80 or acceleration sensor 90 is positioned on top of the magnetostrictive sensor 100. The sensors may be placed on top of each other to decrease the size of the hybrid sensor 95 or 115. The sensors may also be located on separate supports or components. The opening 109 in the housing 108 for the pressure sensor 80 may also be located in various locations and have various configurations.

It should also be understood that the hybrid sensors 95 and 115 may also include other types of sensors in addition to or in place of the magnetostrictive sensor 100, the pressure sensor 80, and/or the acceleration sensor 90. In some embodiments, an acoustic wave sensor is used in place of the magnetostrictive sensor 100. Acoustic wave sensors detect the properties of acoustic waves traveling through a component. If the component is modified (i.e., bent or dented during a collision) acoustic waves travel differently through the component. The detected changes of acoustic waves traveling through a component can be used to sense structure modifications and determine if impact has occurred.

Various features and advantages of the invention are set forth in the following claims.

The invention claimed is:

1. A hybrid impact sensor system comprising:
    a control unit; and
    a sensor module, the sensor module including
        a first sensor with first sensing properties and configured to generate a first output signal, wherein the first sensor includes at least one of a sensor including a semiconductor element containing a plurality of piezoresistors, wherein each piezoresistor has an impedance and input and output terminals, and a circuit configured to be coupled to the input and output terminals of the plurality of piezoresistors and capable of sensing the impedance of the plurality of piezoresistors; a magnetostrictive sensor; and an acoustic wave sensor;
        a second sensor with second sensing properties, mounted directly to the first sensor, and configured to generate a second output signal, wherein the second sensing properties are different from the first sensing properties and wherein the second sensor includes at least one of an acceleration sensor and a pressure sensor;
        an electrical connector coupled to the first sensor, the second sensor, and the control unit and configured to transmit the first output signal and the second output signal to the control unit;
        a housing encasing the first sensor and the second sensor and at least a portion of the electrical connector; and
        one or more mounts,
    the control unit positioned outside the housing.

2. A hybrid impact sensor as claimed in claim 1, wherein the second sensor includes a pressure sensor and is configured to detect pressure within a vehicle door cavity.

3. A hybrid impact sensor as claimed in claim 1, wherein the electrical connector is further configured to provide at least one of amplification and filtering to the first output signal and the second output signal in order to improve the characteristics of the first output signal and the second output signal before transmitting the first output signal and the second output signal to the control unit.

4. A hybrid impact sensor as claimed in claim 1, wherein the one or more mounts are configured to be attached to a component of a vehicle.

5. A hybrid impact sensor as claimed in claim 1, further comprising potting material.

6. A hybrid impact sensor as claimed in claim 1, further comprising a support.

7. A hybrid impact sensor as claimed in claim 6, wherein the first sensor is attached to the support.

8. A hybrid impact sensor as claimed in claim 6, wherein the second sensor is attached to the support.

9. A hybrid impact sensor as claimed in claim 6, wherein the one or more mounts are located at ends of the support.

10. A hybrid impact sensor as claimed in claim 1, wherein the second sensor includes a pressure sensor and the housing includes an opening for the second sensor.

11. A method of sensing impact to a structure, the method comprising:
    providing a control unit;
    providing a sensor module, the sensor module including
        a first sensor of a first sensing type, wherein the first sensor includes at least one of a sensor including a semiconductor element containing a plurality of piezoresistors, wherein each piezoresistor has an impedance and input and output terminals, and a circuit configured to be coupled to the input and output terminals of the plurality of piezoresistors and capable of sensing the impedance of the plurality of piezoresistors; a magnetostrictive sensor; and an acoustic wave sensor;
        a second sensor of a second sensing type mounted directly to the first sensor, wherein the second sensing type is different from the first sensing type and wherein the second sensor includes at least one of an acceleration sensor and a pressure sensor;
        an electrical connector coupled to the first sensor, the second sensor, and the control unit and configured to transmit the first output signal and the second output signal to the control unit;
        a housing encasing the first sensor and the second sensor and at least a portion of the electrical connector; and
        one or more mounts;
    positioning the control unit outside the housing;
    generating a first output signal; and
    generating a second output signal.

12. A method as claimed in claim 11, further comprising providing at least one of amplification and filtering to the first output signal and the second output signal with the electrical connector in order to improve the characteristics of the first output signal and the second output signal before transmitting the first output signal and the second output signal to the control unit.

13. A method as claimed in claim 11, further comprising attaching the one or more mounts to a component of a vehicle.

14. A method as claimed in claim 11, further comprising filling the housing with potting material.

15. A method as claimed in claim 11, further comprising providing a support.

16. A method as claimed in claim 15, further comprising attaching the first sensor to the support.

17. A method as claimed in claim 11, further comprising attaching the second sensor to the support.

18. A method as claimed in claim 15, further comprising placing the one or more mounts at ends of the support.

19. A method as claimed in claim 11, further comprising providing an opening in the housing, wherein the second sensor includes a pressure sensor.

20. A method as claimed in claim 11, further comprising detecting pressure within a vehicle door cavity, wherein the second sensor includes a pressure sensor.

21. A hybrid impact sensor comprising:
a support containing one or more mounts;
a semiconductor element mounted to the support between the one or more mounts and containing a plurality of piezoresistors each piezoresistor having an impedance and input and output terminals, the plurality of piezoresistors including sensing piezoresistors and reference piezoresistors, each of the sensing piezoresistors having a non-strained impedance that is different than a non-strained impedance of each of the reference piezoresistors;
a circuit configured to be coupled to the input and output terminals of the plurality of piezoresistors and capable of sensing the impedance of the plurality of piezoresistors; and
a pressure sensor configured to generate a pressure signal.

22. A hybrid impact sensor as claimed in claim 21, wherein the support is configured to receive stress waves.

23. A hybrid impact sensor as claimed in claim 21, wherein the semiconductor element is configured to be mounted along an entire surface of the support such that stress waves that travel through the support distort the semiconductor element.

24. A hybrid impact sensor as claimed in claim 21, wherein the one or more mounts of the support are located at ends of the support.

25. A hybrid impact sensor as claimed in claim 21, wherein the one or more mounts of the support are configured to be attached to a component requiring stress wave sensing.

26. A hybrid impact sensor as claimed in claim 25, wherein the one or more mounts of the support are configured to allow stress waves traveling through the component to also travel through the support.

27. A hybrid impact sensor as claimed in claim 21, wherein the circuit is configured to be mounted on a printed circuit board.

28. A hybrid impact sensor as claimed in claim 27, wherein the pressure sensor is attached to the printed circuit board.

29. A hybrid impact sensor as claimed in claim 21, further comprising a connector configured to be coupled to at least one of the circuit, the pressure sensor, and a control unit.

30. A hybrid impact sensor as claimed in claim 29, wherein the connector is further configured to output at least one of the pressure signal and the impedance to a control unit.

31. A hybrid impact sensor as claimed in claim 21, wherein the pressure sensor is configured to detect pressures changes within a door cavity of a vehicle.

32. A hybrid impact sensor as claimed in claim 21, further comprising a housing.

33. A hybrid impact sensor as claimed in claim 32, wherein the housing includes an opening for the pressure sensor.

34. A hybrid impact sensor as claimed in claim 21, wherein the pressure sensor is attached to the support.

35. A method for sensing impact to a structure, the method comprising:
providing a support with one or more mounts;
attaching a semiconductor element containing a plurality of piezoresistors to the support, each of the semiconductor elements having an impedance and input and output terminals, the plurality of piezoresistors including sensing piezoresistors and reference piezoresistors, each of the sensing piezoresistors having a non-strained impedance that is different than a non-strained impedance of each of the reference piezoresistors;
providing a circuit configured to be coupled to the input and output terminals of the plurality of piezoresistors and capable of sensing the impedance of the plurality of piezoresistors;
connecting the support to the structure with the one or more mounts of the support;
providing a pressure sensor configured to generate a pressure signal;
encasing the support and the pressure sensor in a housing;
sensing the impedance of the plurality of piezoresistors; and sensing the pressure signal.

36. A method as claimed in claim 35, further comprising attaching the semiconductor element along an entire surface of the support such that stress waves that travel through the support distort the semiconductor element.

37. A method as claimed in claim 35, further comprising mounting the circuit on a printed circuit board.

38. A method as claimed in claim 37, further comprising mounting the pressure sensor on the printed circuit board.

39. A method as claimed in claim 35, further comprising transmitting at least one of the impedance and pressure signal to a control unit.

40. A method as claimed in claim 35, further comprising attaching the pressure sensor to the support.

41. A method as claimed in claim 35, further comprising detecting pressure within a door cavity of a vehicle.

42. A method as claimed in claim 35, further comprising providing an opening in the housing for the pressure sensor.

43. A hybrid impact sensor comprising:
a support containing one or more mounts;
a semiconductor element mounted to the support between the one or more mounts and containing a plurality of piezoresistors, each piezoresistor having input and output terminals, the plurality of piezoresistors including sensing piezoresistors and reference piezoresistors, each of the sensing piezoresistors having a non-strained impedance that is different than a non-strained impedance of each of the reference piezoresistors;
a circuit configured to be coupled to the input and output terminals of the plurality of piezoresistors and capable of sensing the impedance of the plurality of piezoresistors; and
an acceleration sensor configured to generate an acceleration signal.

44. A hybrid impact sensor as claimed in claim 43, wherein the support is configured to receive stress waves.

45. A hybrid impact sensor as claimed in claim 43, wherein the semiconductor element is configured to be mounted along an entire surface of the support such that stress waves that travel through the support distort the semiconductor element.

46. A hybrid impact sensor as claimed in claim 43, wherein the one or more mounts of the support are located at ends of the support.

47. A hybrid impact sensor as claimed in claim 43, wherein the one or more mounts of the support are configured to be attached to a component requiring stress wave sensing.

48. A hybrid impact sensor as claimed in claim 47, wherein the one or more mounts of the support are configured to allow stress waves traveling through the component to also travel through the support.

49. A hybrid impact sensor as claimed in claim 43, wherein the circuit is configured to be mounted on a printed circuit board.

50. A hybrid impact sensor as claimed in claim 49, wherein the acceleration sensor is attached to the printed circuit board.

51. A hybrid impact sensor as claimed in claim 43, further comprising a connector configured to be coupled to at least one of the circuit, the acceleration sensor, and a control unit.

52. A hybrid impact sensor as claimed in claim 51, wherein the connector is further configured to output at least one of the impedance and the acceleration signal to the control unit.

53. A hybrid impact sensor as claimed in claim 43, further comprising a housing.

54. A hybrid impact sensor as claimed in claim 43, wherein the acceleration sensor is attached to the support.

55. A method for sensing impact to a structure, the method comprising:
   providing a support with one or more mounts;
   attaching a semiconductor element containing a plurality of piezoresistors to the support, each piezoresistor having input and output terminals, the plurality of piezoresistors including sensing piezoresistors and reference piezoresistors, each of the sensing piezoresistors having a non-strained impedance that is different than a non-strained impedance of each of the reference piezoresistors;
   providing a circuit configured to be coupled to the input and output terminals of the plurality of piezoresistors and capable of sensing the impedance of the plurality of piezoresistors;
   connecting the support to the structure with the one or more mounts of the support;
   providing an acceleration sensor configured to generate an acceleration signal;
   encasing the support and the acceleration sensor in a housing;
   sensing the impedance of the plurality of piezoresistors; and
   sensing the acceleration signal.

56. A method as claimed in claim 55, further comprising attaching the semiconductor element along an entire surface of the support such that stress waves that travel through the support distort the semiconductor element.

57. A method as claimed in claim 55, further comprising mounting the circuit on a printed circuit board.

58. A method as claimed in claim 57, further comprising mounting the acceleration sensor to the printed circuit board.

59. A method as claimed in claim 55, further comprising transmitting at least one of the impedance and the acceleration signal to a control unit.

60. A method as claimed in claim 55, further comprising attaching the acceleration sensor to the support.

* * * * *